US012723153B2

(12) United States Patent
Karayianni

(10) Patent No.: US 12,723,153 B2
(45) **Date of Patent: *Sep. 1, 2026**

(54) COPOLYETHERESTER

(71) Applicant: Celanese Polymers Holding, Inc., Wilmington, DE (US)

(72) Inventor: Eleni Karayianni, Geneva (CH)

(73) Assignee: Celanese Polymers Holding, Inc., Wilmington, DE (US)

( * ) Notice: Subject to any disclaimer, the term of this patent is extended or adjusted under 35 U.S.C. 154(b) by 848 days.

This patent is subject to a terminal disclaimer.

(21) Appl. No.: 17/996,481

(22) PCT Filed: Jun. 15, 2021

(86) PCT No.: PCT/US2021/037373

§ 371 (c)(1),
(2) Date: Oct. 18, 2022

(87) PCT Pub. No.: WO2021/257531

PCT Pub. Date: Dec. 23, 2021

(65) Prior Publication Data

US 2023/0212388 A1 Jul. 6, 2023

Related U.S. Application Data

(60) Provisional application No. 63/039,098, filed on Jun. 15, 2020, provisional application No. 63/039,133, filed on Jun. 15, 2020, provisional application No. 63/039,171, filed on Jun. 15, 2020.

(51) Int. Cl.

| | |
|---|---|
| ***C08L 67/02*** | (2006.01) |
| ***C08G 63/183*** | (2006.01) |
| ***C08G 63/672*** | (2006.01) |
| ***C08G 65/20*** | (2006.01) |
| ***C08K 3/32*** | (2006.01) |
| ***C08K 5/3492*** | (2006.01) |
| ***C08K 5/521*** | (2006.01) |
| ***C08K 5/5313*** | (2006.01) |
| ***C09K 21/12*** | (2006.01) |
| ***H01B 3/42*** | (2006.01) |
| *C08K 3/016* | (2018.01) |
| *C08K 5/00* | (2006.01) |

(52) U.S. Cl.

CPC .......... *C08L 67/025* (2013.01); *C08G 63/183* (2013.01); *C08G 63/672* (2013.01); *C08G 65/20* (2013.01); *C08K 3/32* (2013.01); *C08K 5/34922* (2013.01); *C08K 5/34928* (2013.01); *C08K 5/521* (2013.01); *C08K 5/5313* (2013.01); *C09K 21/12* (2013.01); *H01B 3/421* (2013.01); *H01B 3/422* (2013.01); *C08K 3/016* (2018.01); *C08K 2003/327* (2013.01); *C08K 2003/328* (2013.01); *C08K 2003/329* (2013.01); *C08K 5/0066* (2013.01); *C08K 2201/003* (2013.01); *C08K 2201/014* (2013.01); *C08L 2201/02* (2013.01); *C08L 2203/202* (2013.01)

(58) Field of Classification Search

CPC ..... C08L 67/025; C08G 63/183; C08G 65/20; C08G 63/672; C08K 3/32; C08K 5/34922; C08K 5/521; C08K 5/5313; C08K 5/34928; C09K 21/12; H01B 3/421; H01B 3/422

See application file for complete search history.

(56) References Cited

U.S. PATENT DOCUMENTS

| | | | | |
|---|---|---|---|---|
| 2006/0020064 A1* | 1/2006 | Bauer | .................. | C08K 5/5313 524/115 |
| 2009/0176091 A1 | 7/2009 | Karayianni et al. | | |
| 2010/0025643 A1 | 2/2010 | Hoerold et al. | | |
| 2012/0211256 A1 | 8/2012 | Karayianni et al. | | |
| 2013/0146330 A1 | 6/2013 | Ni | | |
| 2013/0190432 A1 | 7/2013 | Krause et al. | | |
| 2016/0009901 A1 | 1/2016 | Keestra et al. | | |
| 2016/0340588 A1 | 11/2016 | Bauer et al. | | |
| 2019/0106568 A1 | 4/2019 | Karayianni et al. | | |
| 2019/0153197 A1 | 5/2019 | Krause et al. | | |
| 2020/0168362 A1 | 5/2020 | Karayianni | | |
| 2023/0220194 A1 | 7/2023 | Karayianni | | |
| 2023/0340255 A1 | 10/2023 | Karayianni | | |

FOREIGN PATENT DOCUMENTS

| | | |
|---|---|---|
| CN | 110128816 A | 8/2019 |
| CN | 110527237 A | 12/2019 |
| JP | WO 2015/141708 A1 | 4/2017 |

OTHER PUBLICATIONS

Zhao et al., "Exploring the effect of melamine pyrophosphate and aluminum hypophosphite on flame retardant wood flour/polypropylene composites," *Construction and Building Materials* 170, 2018, pp. 193-199.

International Search Report and Written Opinion for PCT/US2021/037373 dated Sep. 22, 2021, 9 pages.

* cited by examiner

*Primary Examiner* — John E Uselding

(74) *Attorney, Agent, or Firm* — Dority & Manning, P.A.

(57) ABSTRACT

The invention provides a copolyetherester compositions that are resistant to burning and which show reduced smoke production when exposed to heat or flame. The compositions include a polymer, aluminum diethylphosphinate and a zinc salt of phosphorus acid. Optionally, the composition can include an aluminum salt of phosphorus acid.

16 Claims, No Drawings

COPOLYETHERESTER

CROSS-REFERENCE TO RELATED APPLICATIONS

This application claims priority under 35 U.S.C. § 365 to U.S. Provisional Application Nos. 63/039,098; 63/039,133; and 63/039,171, each of which was filed on Jun. 15, 2020, and each of which is incorporated herein by reference in its entirety.

FIELD OF INVENTION

The present invention relates to the field of copolyetheresters, particularly flame-retardant copolyetheresters.

BACKGROUND OF THE INVENTION

Several patents, patent applications and publications are cited in this description in order to more fully describe the state of the art to which this invention pertains. The entire disclosure of each of these patents, patent applications and publications is incorporated by reference herein.

Copolyetheresters are a group of elastomeric polyesters having hard segments comprising polyester blocks and soft segments comprising long-chain polyether diols. They are widely used in applications in which resilience and elasticity are required.

A typical copolyetherester is made by reacting one or more diacid moieties with a short-chain diol and a long-chain polyether diol.

Copolyetheresters show excellent elasticity, maintenance of mechanical properties at low temperature and good fatigue performance.

There is an ongoing need for non-halogen-containing fire resistant ("NHFR") copolyetheresters. Dialkyl phosphinate salts are well-known, non-halogenated flame retardant molecules. U.S. Pat. No. 7,420,007 [Clariant Produkte (Deutschland) GmbH] describes the use of dialkylphosphinic salts of the formula (I):

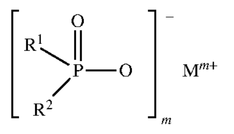

where $R^1$, $R^2$ are identical or different and are $C_1$-$C_6$-alkyl linear or branched;

M is Mg, Ca, Al, Sb, Sn, Ge, Ti, Fe, Zr, Zn, Ce, Bi, Sr, Mn, Li, Na, K and/or is a protonated nitrogen base; and m is from 1 to 4;

as flame-retardants in many different polymers, including polyetheresters.

U.S. patent application. Publn. No. US2013/0190432 describes the use of aluminium diethyl phosphinate together with the aluminium salt of phosphorous acid as a flame-retardant stabilizer combination in nylon-6.6, nylon-6T/6.6, nylon-4.6, and PBT.

While the use of flame retardants in polymer resins can significantly reduce flammability, it can unfortunately result in high smoke production upon exposure to heat or flame. This is of concern since smoke can be a significant contributor to damage and mortality in fires.

There is a need for resin and flame-retardant combinations that show not only reduced flammability but also reduced smoke production on exposure to heat or flames.

SUMMARY OF THE INVENTION

In a first aspect, the invention provides a flame-retardant polymer composition comprising:

(A) at least one polymer selected from copolyetherester, polyamide elastomer, thermoplastic polyolefinic elastomers, styrenic elastomer, thermoplastic polyurethane, thermoplastic vulcanizate;

(B) 2 to 25 wt % aluminium diethylphosphinate; and (C) (c1) a zinc salt of phosphorous acid; and optionally (c2) an aluminium salt of phosphorous acid;

wherein if (C) comprises an aluminium salt of phosphorous acid, the total concentration of (C) is defined by:

$$[\text{wt }\%(C)]>25/[\text{wt }\%(B)]$$

and if (C) does not comprise an aluminium salt of phosphorous acid, the total concentration of (C) is defined by:

$$[\text{wt }\%(C)]>40/[\text{wt }\%(B)]$$

wherein the weight percentages are based on the total weight of the flame-retardant polymer composition.

In a second aspect, the invention provides a flame-retardant copolyetherester composition comprising:

(A) at least one copolyetherester;

(B) 2 to 25 wt % aluminium diethylphosphinate; and (C) (c1) a zinc salt of phosphorous acid; and optionally (c2) an aluminium salt of phosphorous acid;

wherein if (C) comprises an aluminium salt of phosphorous acid, the total concentration of (C) is defined by:

$$[wt\ \%\ (C)] > 25/[wt\ \%\ (B)]$$

and if (C) does not comprise an aluminium salt of phosphorous acid, the total concentration of (C) is defined by:

$$[wt\ \%\ (C)] > 40/[wt\ \%\ (B)]$$

wherein the weight percentages are based on the total weight of the flame-retardant copolyetherester composition.

In a third aspect, the invention provides a shaped article made from a flame-retardant copolyetherester composition comprising:

(A) at least one copolyetherester;

(B) 2 to 25 wt % aluminium diethylphosphinate; and (C) (c1) a zinc salt of phosphorous acid; and optionally (c2) an aluminium salt of phosphorous acid;

wherein if (C) comprises an aluminium salt of phosphorous acid, the total concentration of (C) is defined by:

$$[wt\ \%\ (C)] > 25/[wt\ \%\ (B)]$$

and if (C) does not comprise an aluminium salt of phosphorous acid, the total concentration of (C) is defined by:

$$[wt\ \%\ (C)] > 40/[wt\ \%\ (B)]$$

wherein the weight percentages are based on the total weight of the flame-retardant copolyetherester composition.

In a fourth aspect, the invention provides a cable comprising a light or electrical conducting core and at least one sheath made from a flame-retardant copolyetherester composition, said composition comprising:

(A) at least one copolyetherester;

(B) 2 to 25 wt % aluminium diethylphosphinate; and (C) (c1) a zinc salt of phosphorous acid; and optionally (c2) an aluminium salt of phosphorous acid;

wherein if (C) comprises an aluminium salt of phosphorous acid, the total concentration of (C) is defined by:

$$[wt\ \%\ (C)] > 25/[wt\ \%\ (B)]$$

and if (C) does not comprise an aluminium salt of phosphorous acid, the total concentration of (C) is defined by:

$$[wt\ \%\ (C)] > 40/[wt\ \%\ (B)]$$

wherein the weight percentages are based on the total weight of the flame-retardant copolyetherester composition.

In a fifth aspect, the invention provides a method for making a composition of the invention, comprising the step of:

melt-mixing the ingredients listed above, and optionally others, in an extruder.

DETAILED DESCRIPTION OF THE INVENTION

Definitions and Abbreviations

PBT poly(butylene terephthalate)

PTMEG polytetramethylene ether glycol

Copolyetherester or TPC thermoplastic elastomer arising from the reaction of at least one diol, at least one diacid and at least one poly(alkylenoxide)diol DEPAl aluminum diethylphosphinate salt Phosphite as used herein is synonymous with "salt of phosphorous acid" or "salt of phosphonic acid"

Copolyetheresters suitable for the compositions of the invention are polymers made by reacting a $C_2$-$C_6$ diol with an aromatic diacid moiety and a poly(alkyleneoxide)diol.

The poly(alkyleneoxide)diol is preferably selected from poly(ethyleneoxide)diol, poly(propyleneoxide)diol, poly(tetramethyleneoxide)diol ("PTMEG"), and mixtures of these. The poly(propyleneoxide)diol, poly(tetramethyleneoxide) diol may be straight-chain or branched. If they are branched at a carbon containing the terminal hydroxyl, they are preferably end-capped with ethylene glycol or poly(ethyleneoxide)diol. Particularly preferred, poly(propyleneoxide) diol and poly(tetramethyleneoxide)diol ("PTMEG"), and mixtures of these, with PTMEG being more particularly preferred. The $C_2$-$C_6$ diol is preferably selected from ethylene glycol, propylene glycol, butylene glycol, and mixtures of these, with butylene glycol being more preferred.

The aromatic diacid is preferably selected from terephthalate, iso-phthalate, and mixtures of these, with terephthalate being particularly preferred.

Particularly preferred copolyetheresters are selected from:

1. Copolyetheresters made from butylene diol, terephthalate and PTMEG;
2. Copolyetheresters made from butylene diol, mixture of terephthalate and isophthalate and PTMEG;
3. Copolyetheresters made from butylene diol, terephthalate and poly(propyleneoxide)diol;
4. Copolyetheresters made from propylene diol, terephthalate and PTMEG; and
5. Copolyetheresters made from propylene diol, terephthalate and poly(propyleneoxide)diol.

Particularly preferred is a copolyetherester made from butylene diol, terephthalate and PTMEG.

Particularly preferred is a copolyetherester made from butylene diol, terephthalate, isophthalate and PTMEG.

The softness of copolyetheresters is affected by the chain-length (i.e. molecular weight) of the poly(alkyleneoxide)diol and by the relative amount of poly(alkyleneoxide)diol that is used to make the polymer.

In a preferred embodiment, the poly(alkyleneoxide)diol has a molecular weight of at or about 2000 g/mol.

In another preferred embodiment, the poly(alkyleneoxide)diol constitutes from 40 wt % to 80 wt % of the copolyetherester based on the total weight of the copolyetherester, more preferably 50 to 75 wt %, particularly preferably 72.5 wt %.

In a particularly preferred embodiment, the copolyetherester comprises a poly(alkyleneoxide)diol having a molecular weight of at or about 2000 g/mol at 40 wt % to 80 wt % of the copolyetherester based on the total weight of the copolyetherester, more preferably 50 to 75 wt %, particularly preferably 72.5 wt %.

A particularly preferred copolyetherester comprises at or about 72.5 weight percent of polytetramethylene oxide, preferably having an average molecular weight of about 2000 g/mol, as polyether block segments, the weight percentage being based on the total weight of the copolyetherester elastomer, the short chain ester units of the copolyetherester being polybutylene terephthalate segments.

In addition to at least one copolyetherester, the compositions of the invention comprise aluminium diethyl phosphinate ("DEPAl").

The total phosphinate concentration is 2 to 25 wt %, more preferably 10 to 20 wt %, based on the total weight of the copolyetherester composition.

In a preferred embodiment, the DEPAl has a D95 (volume %, measured using laser diffraction technology with a Malvern Mastersizer 2000 particle size analyser instrument, in acetone) of ≤10 microns.

The compositions of the invention additionally comprise a zinc salt of phosphorous acid (Zn phosphite), and optionally an aluminium salt of phosphorous acid (Al phosphite), i.e. a mixture of a zinc phosphite and an aluminium phosphite. Phosphorous acid is also referred to as phosphonic acid, $HP(=O)(OH)_2$.

Phosphorous acid has tautomeric forms as shown below:

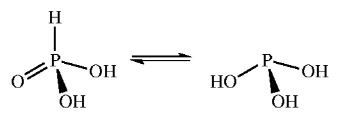

Salts of phosphorous acid are also referred to as phosphites.

Zinc and aluminium phosphites comprise reaction products of phosphorous acid with compounds of the respective metal.

Zinc salts of phosphorous acid are also referred to herein as zinc phosphites.

Particularly preferred is zinc phosphite having CAS number [14332-59-3], depicted below.

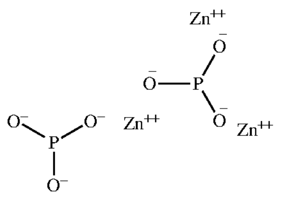

In a preferred embodiment, the zinc phosphite has a particle size of D95 (volume %, measured using laser diffraction technology with a Malvern Mastersizer 2000 particle size analyser instrument, in acetone) of ≤10 microns. Alternatively, the zinc phosphite preferably has particle sizes from 0.1 to 100 μm and particularly preferably from 0.1 to 30 μm.

Particularly preferred is zinc phosphite [14332-59-3] having a D95 (volume %, measured using laser diffraction technology with a Malvern Mastersizer 2000 particle size analyser instrument, in acetone) of ≤10 microns.

When present, preferred aluminium phosphites are those having the CAS numbers [15099 32-8], [119103-85-4], [220689-59-8], [56287-23-1], [156024-71-4], [71449-76-8] and [15099-32-8]. Particularly preferred are aluminium phosphites of the type $Al_2(HPO_3)_3$*0.1-30 $Al_2O_3$*0-50$H_2O$, more preferably of the type $Al_2(HPO_3)_3$*0.2-20 $Al_2O_3$*0-50$H_2O$, most preferably of the type $Al_2(HPO_3)_3$*1-3 $Al_2O_3$*0-50$H_2O$.

Particularly preferred are mixtures of aluminium phosphite and aluminium hydroxide having the composition of 5-95% by weight of $Al_2(HPO_3)_3$*n$H_2O$ and 95-5% by weight of $Al(OH)_3$, more preferably 10-90% by weight of $Al_2(HPO_3)_3$*n$H_2O$ and 90-10% by weight of $Al(OH)_3$, most preferably 35-65% by weight of $Al_2(HPO_3)_3$*n$H_2O$ and 65-35% by weight of $Al(OH)_3$ and in each case n=0 to 4, wherein the weight percentages are based on the total weight of the mixture of aluminum phosphite and aluminum hydroxide.

Also particularly preferred is the aluminium phosphite having the CAS number [56287-23-1].

In a preferred embodiment, the aluminium phosphite has a D95 (volume %, measured using laser diffraction technology with a Malvern Mastersizer 2000 particle size analyser instrument, in acetone) of ≤10 microns.

Particularly preferred is aluminium phosphite [56287-23-1] having a D95 (volume %, measured using laser diffraction technology with a Malvern Mastersizer 2000 particle size analyser instrument, in acetone) of ≤10 microns.

In a preferred embodiment, the composition of the invention comprises zinc phosphite having CAS number [14332-59-3] and aluminium phosphite having the CAS number [56287-23-1].

In a particularly preferred embodiment, the composition comprises zinc phosphite [14332-59-3] having a D95 (volume %, measured using laser diffraction technology with a Malvern Mastersizer 2000 particle size analyser instrument, in acetone) of 10 microns, and aluminium phosphite having the CAS number [56287-23-1] and having a D95 (volume %, measured using laser diffraction technology with a Malvern Mastersizer 2000 particle size analyser instrument, in acetone) of ≤10 microns.

The total phosphite concentration (in wt %, based on the total weight of the composition) satisfies the conditions:

If the phosphite comprises an aluminium salt of phosphorous acid, the total concentration of phosphite (C) is defined by:

$$[wt\ \%\ (C)] > 25/[wt\ \%\ (B)]$$

and if the phosphite does not comprise an aluminium salt of phosphorous acid, the total concentration of phosphite (C) is defined by:

$$[wt\ \%\ (C)] > 40/[wt\ \%\ (B)]$$

wherein the weight percentages are based on the total weight of the composition.

In a preferred embodiment, (C)≤(B).

In compositions of the invention the total phosphite concentration is preferably greater than 0.5 wt %. Preferably the total phosphite concentration is from 3 to 15 wt %, more preferably 5 to 8 wt %, based on the total weight of the copolyetherester composition.

Zinc phosphite is preferably used at a concentration of from 3 to 10 wt %, more preferably 5 to 8 wt %. Preferably the zinc phosphite having CAS number [14332-59-3] is used at 3 to 10 wt %, more preferably 5 to 8 wt %.

When zinc phosphite is used in the absence of aluminium phosphite, it is preferably present at 3 wt % or greater.

Some particularly preferred compositions comprise the ingredients listed below, consist essentially of, or consist of the ingredients listed below:

TPC: 80 wt %
DEPAl: 10 wt %
Al phosphite, preferably [CAS 56287-23-1]: 5 wt %
Zinc phosphite, preferably [CAS 14332-59-3]: 5 wt %
TPC: 80 wt %
DEPAl: 15 wt %
Zinc phosphite, preferably [CAS 14332-59-3]: 5 wt %
TPC: 77 wt %
DEPAl: 15 wt %
Zinc phosphite, preferably [CAS 14332-59-3]: 8 wt %
TPC: 75 wt %
DEPAl: 15 wt %
Al phosphite, preferably [CAS 56287-23-1]: 5 wt %
Zinc phosphite, preferably [CAS 14332-59-3]: 5 wt %
TPC: 76 wt %
DEPAl: 20 wt %
Zinc phosphite, preferably [CAS 14332-59-3]: 4 wt %
TPC: 72 wt %
DEPAl: 20 wt %
Zinc phosphite, preferably [CAS 14332-59-3]: 8 wt %
TPC: 68 wt %
DEPAl: 20 wt %
Al phosphite, preferably [CAS 56287-23-1]: 4 wt %
Zinc phosphite, preferably [CAS 14332-59-3]: 8 wt %

Another preferred composition of the invention is a copolyetherester composition comprising:

(A) at least one copolyetherester made from butylene diol, terephthalate and PTMEG;

(B) DEPAl;

(C) at least 3 wt % Al phosphite, more preferably at least 5 wt %, most preferably 5-10 wt %, and at least 3 wt % Zn phosphite, more preferably at least 5 wt %, most preferably 5-10 wt %, with Al phosphite [56287-23-1] and zinc phosphite [14332-59-3] being preferred.

TPC: made from butylene diol, terephthalate and PTMEG 80 wt %

DEPAl: 10 wt %

Al phosphite, preferably [CAS 56287-23-1]: 5 wt %

Zinc phosphite, preferably [CAS 14332-59-3]: 5 wt %

TPC: made from butylene diol, terephthalate and PTMEG 80 wt %

DEPAl: 15 wt %

Zinc phosphite, preferably [CAS 14332-59-3]: 5 wt %

TPC: made from butylene diol, terephthalate and PTMEG 77 wt %

DEPAl: 15 wt %

Zinc phosphite, preferably [CAS 14332-59-3]: 8 wt %

TPC: 75 wt %

DEPAl: 15 wt %

Al phosphite, preferably [CAS 56287-23-1]: 5 wt %

Zinc phosphite, preferably [CAS 14332-59-3]: 5 wt %

TPC: made from butylene diol, terephthalate and PTMEG 76 wt %

DEPAl: 20 wt %

Zinc phosphite, preferably [CAS 14332-59-3]: 4 wt %

TPC: made from butylene diol, terephthalate and PTMEG 72 wt %

DEPAl: 20 wt %

Zinc phosphite, preferably [CAS 14332-59-3]: 8 wt %

TPC: made from butylene diol, terephthalate and PTMEG 68 wt %

DEPAl: 20 wt %

Al phosphite, preferably [CAS 56287-23-1]: 4 wt %

Zinc phosphite, preferably [CAS 14332-59-3]: 8 wt %

The copolyetherester compositions described herein may additionally comprise (B') 0.2 to 16% by weight of aluminum salts of ethylbutylphosphinic acid, dibutylphosphinic acid, ethylhexylphosphinic acid, butylhexylphosphinic acid and/or dihexylphosphinic acid, or mixtures of any of these.

Component (B'), when present, is preferably selected from aluminium salts of ethylbutylphosphinic acid, dibutylphosphinic acid, ehylhexylphosphinic acid, and mixtures of these.

The copolyetherester compositions described herein may additionally comprise (D) one or more of a nitrogen-containing synergist and/or a phosphorus-containing flame retardant and/or a nitrogen-containing flame retardant. The amount of component (D) is 0 to 15 wt %, more preferably 2 to 15 wt %, more particularly preferably 5 to 12 wt %, based on the total weight of the copolyetherester composition.

Preferably, component (D) is selected from at least one melamine derivative, selected from melamine salts with organic or inorganic acids and mixtures of these.

Component (D), when present, is preferably selected from salts of melamine with boric acid, cyanuric acid, phosphoric acid and/or pyro/polyphosphoric acid, and mixtures of these. Particularly preferred is melamine pyrophosphate, particularly at 2 to 15 wt %, more preferably at 5 to 12 wt %, particularly preferably 8 wt %, based on the total weight of the copolyetherester composition.

Component (D) preferably has a mean particle diameter of less than 20 microns, more preferably 15 microns or less, as measured using laser diffraction technology with a Malvern Mastersizer 2000 particle size analyser instrument, in acetone. Particularly preferred is melamine pyrophosphate having a mean particle diameter of 15 microns, as measured using laser diffraction technology with a Malvern Mastersizer 2000 particle size analyser instrument, in acetone, particularly at 2-15 wt %, more preferably 4 to 12 wt %, based on the total weight of the copolyetherester composition.

The copolyetherester compositions described herein may additionally comprise (E) 0 to 10% by weight of an inorganic synergist selected from zinc borate, zinc stannate, boehmite and/or hydrotalcite.

The copolyetherester compositions described herein may additionally comprise (F) 0 to 3% by weight of an organic phosphonite and/or a mixture of an organic phosphonite and an organic phosphite.

The copolyetherester compositions described herein may additionally comprise (G) 0 to 3% by weight of an ester and/or salt of long-chain aliphatic carboxylic acids (fatty acids) which typically have chain lengths of $C_{14}$ to $C_{40}$. Particularly preferred are stearic acid and its esters and/or salts, and esters and/or salts of montanic acid, in particular calcium salts.

In a particularly preferred embodiment, the copolyetherester composition comprises a flame-retardant mixture comprising the following components:

20 to 97.8 wt % (B);

0.2 to 16 wt % (B');

1 to 80 wt % (c1);

1 to 80 wt % (c2);

wherein the sum of components equals 100 wt % based on the total weight of the flame-retardant mixture.

In a particularly preferred embodiment, the copolyetherester composition comprises a flame-retardant mixture comprising the following components:

20 to 97.6 wt % (B);

0.2 to 16 wt % (B');

1 to 50 wt % (c1);

1 to 50 w % (c2);

0 to 30 wt % (D);

0 to 10 wt % (E);

0.1 to 2 wt % (F);

0.1 to 2 wt % (G);

wherein the sum of components equals 100 wt % based on the total weight of the flame-retardant mixture.

In a particularly preferred embodiment, the copolyetherester composition comprises a flame-retardant mixture comprising the following components:

20 to 97.6 wt % (B);

0.2 to 16 wt % (B');

1 to 30 wt % (c1);

0 to 80 wt % (c2);

1 to 10 wt % (D);

0 to 10 wt % (E);

0.1 to 2 wt % (F);

0.1 to 2 wt % (G);

wherein the sum of components equals 100 wt % based on the total weight of the flame-retardant mixture.

In a particularly preferred embodiment, the copolyetherester composition comprises a flame-retardant mixture comprising the following components:

20 to 96.6 wt % (B);

0.2 to 16 wt % (B');

1 to 50 wt % (c1);

1 to 50 wt % (c2);

1 to 10 wt % (D);

0 to 10 wt % (E);
0.1 to 2 wt % (F);
0.1 to 2 wt % (G);
wherein the sum of components equals 100 wt % based on the total weight of the flame-retardant mixture.

In a particularly preferred embodiment, the copolyetherester composition comprises a flame-retardant mixture comprising the following components:

20 to 96.6 wt % (B);
0.2 to 16 wt % (B');
1 to 50 wt % (c1);
1 to 50 wt % (c2);
0 to 10 wt % (D);
1 to 10 wt % (E);
0.1 to 2 wt % (F);
0.1 to 2 wt % (G);
wherein the sum of components equals 100 wt % based on the total weight of the flame-retardant mixture.

The copolyetherester compositions described herein may further comprise additives that include, but are not limited to, one or more of the following components as well as combinations of these: metal deactivators, such as hydrazine and hydrazide; heat stabilizers; antioxidants; modifiers; colorants, lubricants, fillers and reinforcing agents, impact modifiers, flow enhancing additives, antistatic agents, crystallization promoting agents, conductive additives, viscosity modifiers, nucleating agents, plasticizers, mold release agents, scratch and mar modifiers, drip suppressants, adhesion modifiers and other processing aids known in the polymer compounding art. Preferably, the additives are selected from the group consisting of stabilizers, processing agents, metal deactivators, antioxidants, UV stabilizers, heat stabilizers, dyes and/or pigments. When used, the total amount of these additives is preferably about 0.05 to about 10 weight percent, based on the total weight of the copolyetherester formulation.

The compositions of the invention show excellent flammability performance. Flammability can be assessed by methods known to one skilled in the art. One method is Limiting Oxygen Index ("LOI") according to test method ISO 4589-1/-2, using test bars in the shape of rectangular bars of dimension 125 mm long by 13 mm wide and having an average thickness of about 1.7±0.1 mm.

Preferably the compositions of the invention show an LOI of 19 or greater, more preferably 21 or greater, more particularly preferably 23 or greater when measured according to test method ISO 4589-1/-2, using test bars in the shape of rectangular bars of dimension 125 mm long by 13 mm wide and having an average thickness of about 1.7±0.1 mm.

Preferably the compositions of the invention show a ratio of LOI of the composition incorporating the DEPAl and metal phosphite(s) to LOI of the composition without the metal phosphite(s) of about 0.75 or greater, more preferably 0.9 or greater, more particularly preferably 1.0 or greater when measured according to test method ISO 4589-1/-2, using test bars in the shape of rectangular bars of dimension 125 mm long by 13 mm wide and having an average thickness of about 1.7±0.1 mm.

Often compositions showing good flammability performance produce excessive smoke on exposure to heat and/or flame. The compositions of the invention achieve a favorable combination of good flammability performance and reduced smoke production.

Smoke density testing can be performed according to ISO 5659 test standard inside a NBS smoke chamber. Test specimens are prepared as plaques having an area of 75 mm×75 mm and thickness of 2 mm. The specimens are mounted horizontally within the chamber and exposed to a constant thermal irradiance on their upper surface of 25 $kW/m^2$ via a radiator cone and heat flux meter and in the presence of a pilot flame for a period of about 10 min. The smoke evolved over time is collected in the chamber, and the attenuation of a light beam passing through the smoke is measured with a photometric system including a 6.5 V incandescent lamp, a photomultiplier tube, and a high accuracy photodetector. The results are measured in terms of light transmission over time and reported in terms of specific optical density, $D_s$. $D_s$ is inversely proportional to light transmission and is given for a specific path length equal to the thickness of the molded specimen. Smoke production is measured as max specific optical density, $D_{s,max}$, and the total smoke production during the first 4 min of the test, VOF4. VOF4 is calculated as: $D_{s1min}+D_{s2min}+D_{s3min}+(D_{s4min}/2)$, where $D_{s1min}$, $D_{s2min}$, $D_{s3min}$, and $D_{s4min}$ are the values of the specific optical density recorded at the $1^{st}$, $2^{nd}$, $3^{rd}$ and $4^{th}$ minutes respectively. Any dripping from the plaque test specimen occurring during the test is recorded. The weight of the dripped material is subtracted from the weight of the 75 mm×75 mm×2 mm test plaque. This difference is reported in grams as the "mass retained" during experiment time. A normalised $D_{s,max}$ can be calculated by dividing $D_{s,max}$ over the mass retained during the experiment time, and is reported as $D_{s,\ max,\ ret}$.

Low values of $D_{s,max,\ ret}$ and VOF4 are desirable and indicative of material that will detract less from visibility in the event of fire, thus allowing rapid escape of people from confined spaces. Without any smoke, light transmittance is 100% and $D_s$ is 0.

The parameters VOF4 and $D_{s,max,\ ret}$ can be used to evaluate smoke performance.

The compositions of the invention preferably show a VOF4 measured according to ISO 5659 test standard and using plaques having an area of 75 mm×75 mm and thickness of 2 mm, of not greater than 1000, more preferably not greater than 800, more particularly not greater than 750.

The compositions of the invention preferably show a $D_{s,max,\ ret}$ measured according to ISO 5659 test standard and using plaques having an area of 75 mm×75 mm and thickness of 2 mm, of not greater than 45, more preferably not greater than 40, more particularly not greater than 35.

The compositions of the invention preferably show a ratio of $D_{s,max,\ ret}$ of the composition including the DEPAl and metal phosphite(s) to $D_{s,max,\ ret}$ of the composition without metal phosphite(s) measured according to ISO 5659 test standard and using plaques having an area of 75 mm×75 mm and thickness of 2 mm, of not greater than 0.9, more preferably not greater than 0.8, more particularly not greater than 0.7.

In a more particularly preferred embodiment, the compositions of the invention have an LOI of 21 or greater, more preferably 23 or greater, more particularly preferably 25 or greater when measured according to test method ISO 4589-1/-2, using test bars in the shape of rectangular bars of dimension 125 mm long by 13 mm wide and having an average thickness of about 1.7±0.1 mm, and a $D_{s,max,\ ret}$ measured according to ISO 5659 test standard and using plaques having an area of 75 mm×75 mm and thickness of 2 mm, of not greater than 45, more preferably not greater than 40, more particularly not greater than 35.

In a more particularly preferred embodiment, the compositions of the invention have a ratio of LOI of the composition incorporating the DEPAl and metal phosphite(s) to LOI of the composition without the metal phosphite(s) of about 0.75 or greater, more preferably 0.9 or greater, more particularly preferably 1.0 or greater when measured according to test method ISO 4589-1/-2, using test bars in the shape of rectangular bars of dimension 125 mm long by 13 mm wide and having an average thickness of about 1.7±0.1 mm, and a ratio of $D_{s,max,\ ret}$ of the composition including the DEPAl and metal phosphite(s) to $D_{s,max,\ ret}$ of the composition without metal phosphite(s) measured according to ISO 5659 test standard and using plaques having an area of 75 mm×75 mm and thickness of 2 mm, of not greater than 0.9, more preferably not greater than 0.8, more particularly not greater than 0.7.

The compositions of the invention are made by melt blending the ingredients until a homogeneous blend is obtained. Melt-blending can be carried out, for example, in a twin-screw extruder.

The compositions of the invention are suited to any use in which flame retardancy and reduced smoke production are important. In particular, the compositions of the invention are suitable for making moulded articles (injection moulding, blow-moulding), extruded articles, films, filaments and/or fibres. The compositions of the invention are particularly suited to housings for electrical connectors, parts in contact with current in power distributors, circuit boards, casting compounds, current plugs, circuit breakers, lamp housings, LED lamp housings, capacitor housings, bobbins, fans, protective contacts, plugs, in/on circuit boards, housings for plugs, cables, flexible printed circuit boards, charging cables, and motor covers. Some particularly preferred applications include wire and cable sheathing (including optical cables), automotive uses, trains and aeronautic uses.

A particularly preferred application is wire and cable, in which a light-conducting element or an electrically conductive element or both are surrounded by a sheath made from a composition of the invention. The invention thus extends to wires and cables comprising an electrically conductive element as core, such as a metal wire (for example copper, silver, etc.) and a sheath made from a composition of the invention. The invention also extends to optical cables, comprising a light-conducting element as core and a sheath made from a composition of the invention.

A preferred method for making cables or wires according to the invention is co-axial extrusion. In this method, the conductive element is fed through a die while the sheath of composition is extruded around it. The wire or cable may comprise other elements in the core, such as reinforcing structures or fibers. It may additionally comprise additional sheathing materials both interior to the sheath of the composition of the invention or exterior to the sheath of the composition of the invention. The sheath of the composition of the invention may serve as the insulation, the jacket or both.

The invention is further illustrated by certain embodiments in the examples below which provide greater detail for the compositions, uses and processes described herein. These examples, which set forth a preferred mode presently contemplated for carrying out the invention, are intended to illustrate and not to limit the invention.

EXAMPLES

Materials

The following materials were used to prepare the flame-retardant polymer compositions described herein and the compositions of the comparative examples.

Copolyetherester (TPC): a copolyetherester elastomer comprising about 72.5 weight percent of polytetramethylene oxide having an average molecular weight of about 2000 g/mol as polyether block segments, the weight percentage being based on the total weight of the copolyetherester elastomer, the short chain ester units of the copolyetherester being polybutylene terephthalate segments. The copolyetherester elastomer contained up to 6 weight percent of heat stabilizers, antioxidants and metal deactivators.

DEPAl: Aluminium diethylphosphinate.

Al Phosphite: Phosphorous acid, Aluminium salt [CAS 56287-23-1] Zn Phosphite: Phosphorous acid, Zinc salt [CAS 14332-59-3].

Melamine pyrophosphate: melamine pyrophosphate having a mean particle diameter of 15 microns, as measured using laser diffraction technology with a Malvern Mastersizer 2000 particle size analyser instrument, in acetone.

Test Methods

Flame Retardance

Flammability testing was performed according to Limiting Oxygen Index ("LOI") Test method ISO 4589-1/-2. Test specimens were prepared from the compositions set forth in the tables by melt-extruding narrow flat strips in a standard extruder having barrel temperatures set at about 170° C. to about 190° C. and cutting test specimens in the shape of rectangular bars of dimension 125 mm long by 13 mm wide and having an average thickness of about 1.7±0.1 mm from the thus-obtained flat strips. Test specimens were conditioned for at least 72 hours at room temperature and 50% relative humidity before testing. According to this test, the specimen is clamped vertically at the centre of a glass chimney at room temperature in an atmosphere of a mixture of oxygen and nitrogen slowly fed into the glass column upwards, where the relative concentration of oxygen and nitrogen can be changed. The upper end of the test sample is ignited with a pilot flame and burns downward. The burning behaviour of the specimen is observed to compare the period for which burning continues. LOI is the minimum concentration of oxygen, expressed as a volume percentage, required to sustain the combustion of the sample indicated by a target burning time after ignition of less than 180 sec. High values of LOI are desirable and indicative of less easily ignited and less flammable material.

Smoke Density

Smoke density testing was performed according to ISO 5659 test standard inside a NBS smoke chamber, supplied by Fire Testing Technologies. Test specimens were prepared from the compositions of the tables by melt-extruding narrow flat strips in a standard extruder having barrel temperatures set at about 170° C. to about 190° C. and compression molding the strips to form plaques having an area of 75 mm×75 mm and thickness of 2 mm. The specimens were mounted horizontally within the chamber and exposed to a constant thermal irradiance on their upper surface of 25 $kW/m^2$ via a radiator cone and heat flux meter and in the presence of a pilot flame for a period of about 40 min. The smoke evolved over time was collected in the chamber, and the attenuation of a light beam passing through the smoke was measured with a photometric system including a 6.5 V incandescent lamp, a photomultiplier tube, and a high accuracy photodetector. The results were measured in terms of light transmission over time and reported in terms of specific optical density, $D_s$. $D_s$ is inversely proportional to light transmission and is given for a specific path length equal to the thickness of the molded specimen. Comparison between the material compositions is made via the measurement of max specific optical density, $D_{s,max}$ and the total smoke production during the first 4 min of the test, VOF4. VOF4 is calculated as: $D_{s1min}+D_{s2min}+D_{s3min}+(D_{s4min}/2)$, where $D_{s1min}$, $D_{s2min}$, $D_{s3min}$, and $D_{s4min}$ are the values of the specific optical density recorder at the 1st, 2nd, 3rd, and 4th minutes respectively. Any dripping from the plaque test specimen occurring during the test is recorded. The weight of the dripped material is subtracted from the weight of the 75 mm×75 mm×2 mm test plaque. This difference is reported in grams as the "mass retained" during experiment time. A normalised $D_{s,max}$ can be calculated by dividing $D_{s,max}$ over the mass retained during the experiment time, and is reported as $D_{s,\ max,\ ret}$.

$D_{s,max}$ and VOF4 values were calculated automatically by the software of the NBS smoke chamber. Low values of $D_{s,max,ret}$ and VOF4 are desirable and indicative of material that will less distract visibility in the event of fire, thus allowing rapid escape of people from confined spaces. Without any smoke light transmittance is 100% and $D_s$ is 0.

Experimental Data

Compositions designated with "CE" are comparative, and compositions designated with "E" are inventive.

Table 1

At 20 wt % DEPAl (CE4, E4, E13 and E7), flammability performance is only slightly changed when Zn phosphite or Zn phosphite and Al phosphite are added, and smoke production is significantly reduced.

All of the inventive compositions have good flame retardancy performance. In some cases better flammability performance than the corresponding controls is observed.

In Table 1, $LOI_{ex}/LOI_0$ means the ratio of the LOI of the experimental material (i.e. containing DEPAl plus phosphite), to the LOI of the control material (i.e. containing DEPAl without any phosphite).

In Table 1, $D_{s,\ max,\ ret,\ ex}/D_{s,\ max,\ ret,\ 0}$ means the ratio of the $D_{s,\ max,\ ret}$ of the experimental material (i.e. containing DEPAl plus phosphite), to the $D_{s,\ max,\ ret}$ of the control material (i.e. containing DEPAl without any phosphite).

While certain of the preferred embodiments of this invention have been described and specifically exemplified above, it is not intended that the invention be limited to such embodiments. Various modifications may be made without departing from the scope and spirit of the invention, as set forth in the following claims.

TABLE 1

| DEPAl/Al phosphite/Zn phosphite | CE1 [%] | CE2 [%] | E5 [%] | CE3 [%] | CE9 [%] | E3 [%] | E12 [%] | E6 [%] | E15 [%] | CE4 [%] | E4 [%] | E13 [%] | E7 [%] | E14 [%] | CE5 [%] | CE6 [%] | CE7 [%] | CE8 [%] |
|---|---|---|---|---|---|---|---|---|---|---|---|---|---|---|---|---|---|---|
| TPC | 95 | 90 | 80 | 85 | 82.5 | 80 | 77 | 75 | 69 | 80 | 76 | 72 | 68 | 68 | 95 | 92 | 92 | 84 |
| DEPAl | 5 | 10 | 10 | 15 | 15 | 15 | 15 | 15 | 15 | 20 | 20 | 20 | 20 | 20 | — | — | — | — |
| Al phosphite | — | — | 5 | — | — | — | — | 5 | — | — | — | — | 4 | 8 | 5 | 8 | — | 8 |
| Zn phosphite | — | — | 5 | — | 2.5 | 5 | 8 | 5 | 8 | — | 4 | 8 | 8 | 4 | — | — | 8 | 8 |
| Melamine pyrophosphate | — | — | — | — | — | — | — | — | 8 | | | | | | | | | |
| Total (%) of all ingredients | 100 | 100 | 100 | 100 | 100 | 100 | 100 | 100 | 100 | 100 | 100 | 100 | 100 | 100 | 100 | 100 | 100 | 100 |
| LOI | 18 | 21 | 23 | 29 | 32 | 31 | 29 | 25 | 26 | 29 | 26 | 32 | 27 | 26 | 17 | 17 | 17 | 17 |
| $LOI_{ex}/LOI_0$ | — | — | 1.10 | — | 1.10 | 1.07 | 1 | 0.86 | 0.90 | — | 0.89 | 1.10 | 0.93 | 0.89 | — | — | — | — |
| VOF4 | 574 | 1054 | 690 | 992 | 1160 | 1127 | 769 | 642 | 354 | 1256 | 925 | 773 | 651 | 928 | 471 | 418 | 458 | 398 |
| $D_{s,\ max,\ ret}$ | 28 | 47 | 32 | 50 | 50 | 42 | 31 | 29 | 22 | 56 | 41 | 34 | 30 | 38 | 22 | 19 | 20 | 18 |
| $D_{s,\ max,\ ret,\ ex}/D_{s,\ max,\ ret,\ 0}$ | — | — | 0.68 | — | — | 0.84 | 0.62 | 0.58 | 0.44 | — | 0.73 | 0.61 | 0.54 | 0.68 | — | — | — | — |

Table 1 shows comparative compositions based on increasing levels of DEPAl alone (CE1 to CE4). Increasing the level of DEPAl leads to improved flammability performance, as indicated by increased LOI, however the emitted smoke density is also increased, as indicated by the max smoke density attained and $D_{s,max,ret}$. The total smoke production in the first 4 min is also significantly increased attaining values of higher than 1000 at only 10 wt % level of DEPAl.

Compositions CE5 to CE8 contain Al phosphite and/or Zn phosphite without DEPAl. All show good smoke performance as indicated by VOF4 and $D_{s,max,ret}$, however flammability performance is poor, as indicated by the low LOI values for these compositions.

Inventive compositions E2 to E7 containing DEPAl and 4-8 wt % Zn phosphite or Zn phosphite in combination with Al phosphite surprisingly show a significant reduction in smoke density and VOF4 compared to CE2 to CE4 containing DEPAl alone. For example, comparing compositions having the same level of DEPAl:

At 10 wt % DEPAl (CE2, E5), flammability performance is improved when Al phosphite and Zn phosphite is added, and smoke production is reduced.

At 15 wt % DEPAl (CE3, CE9, E3, E12, E15 and E6), good flammability performance is maintained when Zn phosphite or Zn phosphite and Al phosphite are added, and smoke production is significantly reduced.

The invention claimed is:

1. A flame-retardant polymer composition comprising:

(A) at least one polymer selected from copolyetherester, polyamide elastomer, thermoplastic polyolefinic elastomers, styrenic elastomer, thermoplastic polyurethane, thermoplastic vulcanisate;

(B) 2 to 25 wt % aluminium diethylphosphinate; and (C) (c1) a zinc salt of phosphorous acid and (c2) an aluminium salt of phosphorous acid;

wherein the total concentration of (C) is defined by:

$$[wt\ \%\ (C)] > 25/[wt\ \%\ (B)]$$

wherein the weight percentages are based on the total weight of the composition, wherein the weight percentages are based on the total weight of the composition, wherein the aluminium salt of phosphorous acid is selected from mixtures of aluminium phosphite and aluminium hydroxide having the composition of 5-95% by weight of $Al_2(HPO_3)_3*nH_2O$ and 95-5% by weight of $Al(OH)_3$ wherein n=0 to 4.

2. The composition of claim 1, wherein the at least one polymer comprises a copolyetherester.

3. The composition of claim 1, wherein the copolyetherester is made using one or more of the following:

a poly(alkyleneoxide)diol selected from poly(ethyleneoxide)diol, poly(propyleneoxide)diol, poly(tetramethyleneoxide)diol, and mixtures of two or more of these;

a $C_2$-$C_6$ diol selected from ethylene glycol, propylene glycol, butylene glycol, and mixtures of two or more of these; and an aromatic diacid selected from terephthalate, iso-terephthalate, and mixtures of these.

4. The composition of claim 1, additionally comprising (B') 0.2 to 16 wt % of aluminum salts of ethylbutylphosphinic acid, dibutylphosphinic acid, ethylhexylphosphinic acid, butylhexylphosphinic acid, dihexylphosphinic acid, or mixtures of any of these.

5. The composition of claim 1, wherein the zinc salt of phosphorous acid is zinc phosphite having CAS number [14332-59-3].

6. The composition of claim 1, comprising an aluminium salt of phosphorus acid, wherein the aluminium salt of phosphorous acid is selected from those having the CAS numbers [15099 32-8], [119103-85-4], [220689-59-8], [56287-23-1], [156024-71-4], [71449-76-8], and mixtures of two or more of these.

7. The composition of claim 1, wherein an aluminium phosphite is present at 3 to 10 wt % based on the total weight of the composition, a zinc phosphite is present at 3 to 10 wt % based on the total weight of the composition, or a combination thereof.

8. The composition of claim 1, wherein the concentration of (C)≤(B).

9. The composition of claim 1, further comprising (D) 0 to 15 wt % based on the total weight of the composition of a nitrogen-containing synergist and/or a phosphorus-containing flame retardant and/or a nitrogen-containing flame retardant.

10. The composition of claim 9, wherein component (D) is selected from salts of melamine with boric acid, cyanuric acid, phosphoric acid, pyrophosphoric acid, polyphosphoric acid, and mixtures of two or more of these.

11. The composition of claim 1, having an LOI of 19 or greater when measured according to test method ISO 4589-1/-2, using test bars in the shape of rectangular bars of dimension 125 mm long by 13 mm wide and having an average thickness of about 1.7±0.1 mm.

12. The composition of claim 1, having a $D_{s,max,ret}$ measured according to ISO 5659 test standard and using plaques having an area of 75 mm×75 mm and thickness of 2 mm, of not greater than 45.

13. The composition of claim 1, having an LOI of 19 or greater when measured according to test method ISO 4589-1/-2, using test bars in the shape of rectangular bars of dimension 125 mm long by 13 mm wide and having an average thickness of about 1.7±0.1 mm, and having a $D_{s,max,ret}$ measured according to ISO 5659 test standard and using plaques having an area of 75 mm×75 mm and thickness of 2 mm, of not greater than 45.

14. The composition of claim 1, wherein the aluminium diethylphosphinate, the zinc salt of phosphorous acid, the aluminium salt of phosphorous acid, or any combination thereof has a particle size D95 (volume %, measured using laser diffraction technology with a Malvern Mastersizer 2000 particle size analyser instrument, in acetone) of ≤10 microns.

15. A shaped article made from the composition of claim 1.

16. A cable comprising a light or electrical conducting core and at least one sheath made from a composition of claim 1.

* * * * *